(12) United States Patent
Kurt et al.

(10) Patent No.: US 8,446,666 B2
(45) Date of Patent: May 21, 2013

(54) UV-REFLECTIVE STRUCTURAL COLOR

(75) Inventors: Pinar Kurt, Cambridge, MA (US);
Debasish Banerjee, Ann Arbor, MI (US); Robert E. Cohen, Jamica Plain, MA (US); Michael Rubner, Westford, MA (US); Masahiko Ishii, Okazaki (JP); Minjuan Zhang, Ann Arbor, MI (US)

(73) Assignees: Toyota Motor Engineering & Manufacturing North America, Inc., Erlanger, KY (US); Toyota Motor Corporation, Toyota (JP); Massachusetts Institute of Technology, Cambridge, MA (US)

( * ) Notice: Subject to any disclaimer, the term of this patent is extended or adjusted under 35 U.S.C. 154(b) by 544 days.

(21) Appl. No.: 12/467,656

(22) Filed: May 18, 2009

(65) Prior Publication Data

US 2010/0290109 A1  Nov. 18, 2010

(51) Int. Cl.
*G02B 5/28* (2006.01)
*B05D 5/06* (2006.01)

(52) U.S. Cl.
USPC .................. 359/359; 359/589; 359/586

(58) Field of Classification Search ......... 359/359, 359/580, 584–590
See application file for complete search history.

(56) References Cited

U.S. PATENT DOCUMENTS

| 4,756,602 | A | * | 7/1988 | Southwell et al. ............ 359/588 |
| 5,410,431 | A | * | 4/1995 | Southwell .................... 359/580 |
| 5,569,332 | A | | 10/1996 | Glatfelter et al. |
| 6,156,115 | A | * | 12/2000 | Pfaff et al. ................... 106/403 |
| 6,399,228 | B1 | | 6/2002 | Simpson |
| 6,565,770 | B1 | * | 5/2003 | Mayer et al. ............ 252/301.36 |
| 6,997,981 | B1 | | 2/2006 | Coombs et al. |
| 7,106,516 | B2 | * | 9/2006 | Lotz et al. .................... 359/584 |
| 7,141,297 | B2 | | 11/2006 | Condo et al. |
| 7,215,473 | B2 | | 5/2007 | Fleming |
| 2002/0030882 | A1 | * | 3/2002 | Vitt et al. .................... 359/350 |
| 2003/0059549 | A1 | | 3/2003 | Morrow et al. |
| 2004/0156984 | A1 | | 8/2004 | Vitt et al. |
| 2005/0127840 | A1 | * | 6/2005 | Chowdhury et al. ......... 313/635 |
| 2009/0153953 | A1 | * | 6/2009 | Banerjee et al. ............. 359/359 |
| 2009/0161220 | A1 | * | 6/2009 | Banerjee et al. ............. 359/586 |

* cited by examiner

*Primary Examiner* — Mark Consilvio
(74) *Attorney, Agent, or Firm* — Gifford, Krass, Sprinkle, Anderson & Citkowski, P.C.

(57) ABSTRACT

The present invention discloses a non-quarter wave multilayer structure having a plurality of alternating low index of refraction material stacks and high index of refraction material stacks. The plurality of alternating stacks can reflect electromagnetic radiation in the ultraviolet region and a narrow band of electromagnetic radiation in the visible region. The non-quarter wave multilayer structure, i.e. $n_L d_L \neq n_H d_H \neq \lambda_0/4$, can be expressed as [A 0.5 qH pL(qH pL)$^N$ 0.5 qH G], where q and p are multipliers to the quarter-wave thicknesses of high and low refractive index material, respectively, H is the quarter-wave thickness of the high refracting index material; L is the quarter-wave thickness of the low refracting index material; N represents the total number of layers between bounding half layers of high index of refraction material (0.5 qH); G represents a substrate and A represents air.

11 Claims, 9 Drawing Sheets

UV-REFLECTIVE STRUCTURAL COLOR

FIELD OF THE INVENTION

The present invention is related to a structural color, and in particular to a structural color having ultraviolet-reflective properties.

BACKGROUND OF THE INVENTION

The near ultraviolet (NUV) portion of sunlight having photon energy between 3.1 eV to 4.13 eV is particularly detrimental to polymers. These energetic phonons dissociate the carbon-hydrogen bonds in organic materials via a process known as photo-degradation. Since photo-degradation generally involves sunlight, thermal oxidation caused by near infrared (NIR) light can and does take place in parallel, causing catastrophic failure of the coating system within a few days or weeks if exposed to direct sunlight without any protection.[1,2] Even durable materials such as polyester, silicone-modified polyester, and polyvinylidene fluoride are prone to chalking due to photo-degradation.[3,4]

In the coating industry, one strategy for extending polymer lifetime is to add inorganic ultraviolet (UV) absorbers, such as carbon black and titanium dioxide, to a coating, paint, etc. However, the addition of carbon black and/or titanium oxide typically results in a compromised appearance of the coating.

In a somewhat unrelated field, the same wavelength range responsible for photo-degradation also plays an important role for biological activities of insects and birds.[5-8] Light signals based on reflections from exposed animal body surfaces such as a feather, skin, etc., and having a wavelength range between 340-400 nanometers (nm), are widely used as a means of animal communication in mate attraction,[9] dominance[10] and orientation within a group.[11] In addition, UV reflectance may be a condition dependent indicator of male quality because structural colors are unusually good indicators of feather age or feather quality.[12, 13] Birds and insects have at least four types of cone visual pigments that absorb light in the NUV range[14] and literature on this subject has concluded that due to the NUV vision exhibited by birds, turbine blades coated with NUV-reflective paint could potentially decrease the number of annual avian collisions.[15]

Regarding insects, NUV reflective plastic mulches were developed in the early 1990's and used to successfully to reduce the incidence of aphidborne virus diseases in squash and other crops,[16] to delay colonization by *B. argentifolii* and reduce the incidence of squash silverleaf.[17] Reflecton of NUV light by these mulches confuses and repels incoming *alate aphids* and adult whiteflies, thereby reducing their incidence of alighting on plants.[18,19]

In addition to these "unconventional" applications, NUV-reflective coatings are desirable for many optical devices such as laser, optical filters, microcavity mirrors, or distributed Bragg mirrors.[20-23]

Brilliant colors in the natural world originating from fish, butterflies and/or birds follow the principal of "structural color" through interference of light reflected from a periodic biological nanostructure,[28] structural colors easily reflecting up to 100% of incident light compared to 50-60% for conventional colors based on molecular absorption. In addition, recent discoveries in photonic crystals (PC) have generated significant interest into manipulating the photonic band gap (PGB) in order to gain control over electromagnetic radiation within the PGB.[24-26] As such, dimensional (1D) PCs have proven particularly promising due to their simple design for potential commercial applications, and when designed to reflect light in a narrow range in the visible region, can become or exhibit a structural color. As such, nature's ability to create structural colors has led to 1D PCs that produce structural colors, the 1D PCs consisting of alternating stacks of low and high refractive index materials.[27-30]

Typical quarter-wave Bragg reflectors can be made from alternating stacks of low and high refractive index materials with equal optical thicknesses of these stacks, that is $n_L d_L = n_H d_H = \lambda_0/4$ where $\lambda_0$ is an operating free-space wavelength and $d_L$, $d_H$ and $n_L$, $n_H$ are the thicknesses and refractive indices of the low and high refractive index materials, respectively. All layers within such a multilayer structure have a common phase thickness $\delta = 2\pi n_H d_H/\lambda$ (or $\delta = 2\pi n_L d_L/\lambda$) that results in equivalent two-way travel-time delay for light. In addition, since a translation matrix is periodic in $\delta$, multiband mirror behavior will occur at odd multiples of $\lambda_0$. A quarter-wave reflection design can be represented by $AH(LH)^N G$, where A and G represent air and glass (or substrate), N is the number of stack pairs and L and H represent thicknesses for the low and high refractive index layers.

Methods used most commonly for thin-film deposition include chemical vapor deposition (CVD)[31,32] and physical vapor deposition (PVD).[33,34] And although these methods provide well-controlled film growth, high cost and size limitations have led to alternative methods being sought. While other methods, such as sol-gel process,[35] overcome the limitations of the methods mentioned above, such methods introduce a limitation of uniformity over curved substrates.

The layer-by-layer (LbL) assembly method has been widely used to overcome cost, size and control based limitations. In addition, the LbL method is water based and environmentally friendly with minimum carbon footprint. In recent years, flexibility and control of this approach have been exhibited by depositing alternating polymer-polymer,[36] polymer-nanoparticle,[37,38] and nanoparticle-nanoparticle[39,40] layers that can be stacked using pH and nanoparticle size as controlling parameters through electrostatic interactions.

In summary, UV-reflective coatings are known to be useful and structural colors are known to be aesthetically pleasing. However, heretofore structural colors have not provided appropriate UV-reflection properties. As such, a structural color that also exhibits UV-reflectance would be desirable.

SUMMARY OF THE INVENTION

The present invention discloses a non-quarter wave multilayer structure having a plurality of alternating low index of refraction material stacks and high index of refraction material stacks. The plurality of alternating stacks can reflect electromagnetic radiation in the ultraviolet region and a narrow band of electromagnetic radiation in the visible region. As such, the multilayer structure can be an ultraviolet-reflective structural color.

The non-quarter wave multilayer structure, i.e. $n_L d_L \neq n_H d_H \neq \lambda_0/4$, can be expressed as $[A\ 0.5\ qH\ pL(qH\ pL)^N\ 0.5\ qH\ G]$, where q and p are multipliers to the quarter-wave thicknesses of high and low refractive index material, respectively, H is the quarter-wave thickness of the high refracting index material; L is the quarter-wave thickness of the low refracting index material; N represents the total number of layers between bounding half layers of high index of refraction material (0.5 pH); G represents a substrate and A represents air.

Unlike quarter-wave design multilayer stacks, the non-quarter-wave multilayer structures afford for manipulating of the location and width of multiband behavior. For example, altering or changing of the q and p multipliers affords flexibility in the design and subsequent production of ultraviolet reflective structural colors. In addition, the multilayer structure can reflect more than 70% of the electromagnetic radiation in the ultraviolet region and more than 60% of the narrow band of electromagnetic radiation in the visible region.

The plurality of alternating stacks of the low index of refraction material and the high index of refraction material can be assembled using a layer-by-layer process, however this is not required. In some instances, the low index of refraction material can be made from silica ($SiO_2$) nanoparticles and the high index of refraction material can be made from titania ($TiO_2$) nanoparticles. In addition, one or more optical defects can be incorporated within the multilayer structure and afford for multiband behavior in the ultraviolet and/or visible spectrum.

The multilayer structure can be in the form of a flake and the flake can be a pigment for a paint. As such, a paint having pigment made from flakes of the plurality of alternating stacks of the low index of refraction material and the high index of refraction material can exhibit a structural color with ultraviolet reflective properties. The multilayer structure can also have one or more optical defects incorporated therein such that a blending of two structural colors, an interference filter and the like is provided.

DETAILED DESCRIPTION OF THE INVENTION

The present invention discloses a non-quarter wave multilayer structure that can be a structural color and exhibit ultraviolet (UV) reflective properties. As such, the present invention has utility as a paint pigment. In addition, a flexible process for designing and/or producing the multilayer structure and achieving simultaneous narrow peak reflection in the visible and UV range is disclosed.

The non-quarter wave structure, i.e. $n_L d_L \neq n_H d_H \neq \lambda_0/4$, can be expressed as [A 0.5 qH pL(qH pL)$^N$ 0.5 qH G], where: A represents air; q is a multiplier of a quarter-wave thickness of a high index of refraction material; H is the quarter-wave thickness of the high refracting index material for a given $\lambda_0$; p is a multiplier of a quarter-wave thickness of the low index of refraction material; L is the quarter-wave thickness of the low refracting index material for the same $\lambda_0$; N represents the total number of layers between bounding half layers of high index of refraction material (0.5 qH) and G represents a substrate. The two half layers of high refractive index material (0.5 qH) can be added to the edges of the multilayer structure in order to remove secondary sidebands of reflected radiation.

Figure 1A:
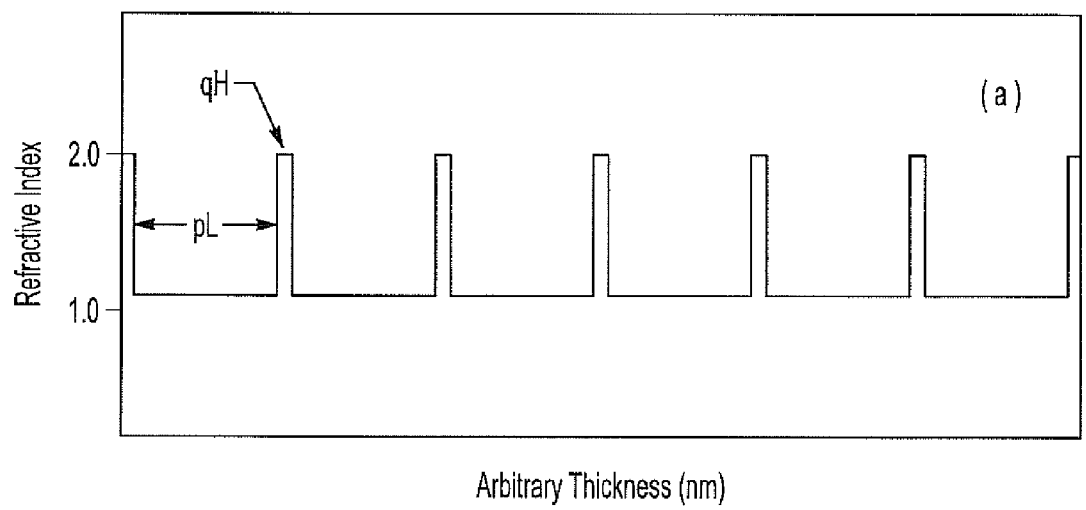
FIG. 1A is a schematic illustration of a refractive index profile of a multilayer stack according to an embodiment of the present invention.
Figure 1B:
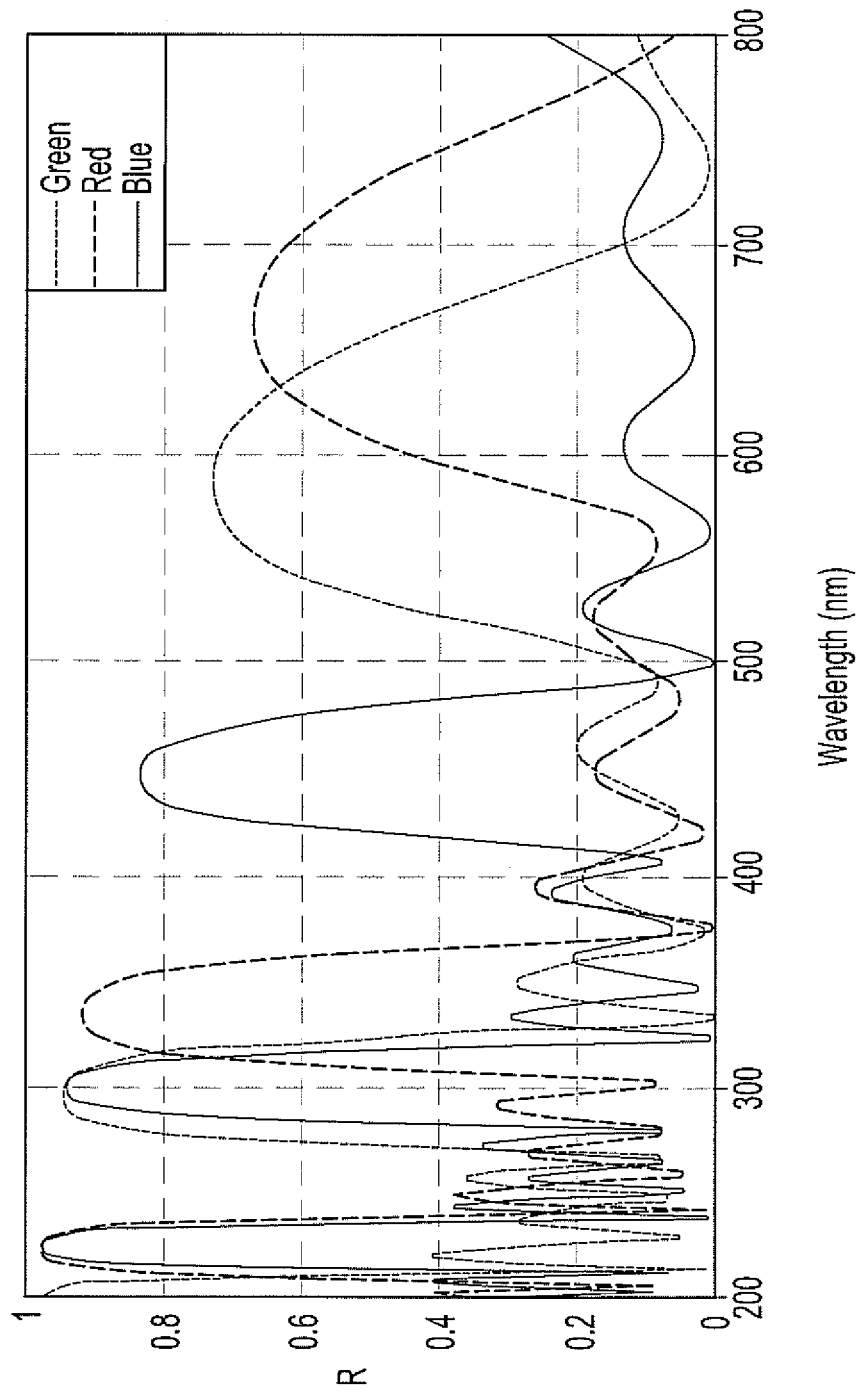
FIG. 1B is a graph illustrating simulated reflectance spectra of a design for ultraviolet-reflective blue, green and red structural colors.

A typical refractive index profile for a non-quarter wave multilayer structure is shown in FIG. 1A with a simulated reflectance spectra at normal incidence and calculated using a transfer matrix method shown in FIG. 1B. An equal contribution of transverse electric (TE) and transverse magnetic (TM) polarization of light was assumed for the calculations.

In some instances, q is between 0.01 and 2.5 and p is between 0.1 and 10, while in other instances q is between 0.1 and 0.9 and p is between 0.5 and 5. In still other instances, q is between 0.1 and 0.5 and p is between 1 and 4. In addition, the total number of layers N can be between 3 and 35, and in some instances is between 3 and 29. In other instances N is between 5 and 21, and in still other instances is between 7 and 15.

The non-quarter wave multilayer structure can also have one or more optical defects incorporated therewithin. For example and for illustrative purposes only, one of the high index of refraction material layers and/or one of the low index of refraction material layers can have a thickness that varies from the standard or generally periodic thickness of the remaining high index of refraction material layers and/or one of the low index of refraction material layers, respectively, in the multilayer structure. Referring to the expression [A 0.5 qH pL(qH pL)$^N$ 0.5 qH G], such an optical defect in a nine layer (N=8) non-quarter multilayer structure could be expressed as [A 0.5 qH pL(qH pL qH pL xqH pL qH pL) 0.5 qH G] where x is a multiplier to one of the qH layer as shown.

The high index of refraction material and the low index of refraction material can be any material known to those skilled in the art such that the difference between the indices of refraction between the two materials provides desirable multiband reflection. For example and for illustrative purposes only, a listing of possible materials that can be used along with their associated index of refraction, is shown in the table below. As illustrated in the table, a variety of materials can be selected to obtain a desired difference and/or percentage difference between the indices of refraction of alternating layers that provide a given non-quarter wave multilayer structure.

The multilayer structure can be made using any technique known to those skilled in the art that can provide one layer of material on top of another layer of material, illustratively including chemical vapor deposition (CVD), physical vapor deposition (PVD), sol-gel processing, spin-coating, layer-by-layer (LbL) processing and the like. As such, the actual process or manner that is used to make a given non-quarter wave multilayer structure can vary, however it is appreciated that a technique or techniques that can produce a desired structure in a cost and time efficient manner is desirable.

TABLE

| Refractive Index Materials (visible region) | |
|---|---|
| Material | Refractive Index |
| Germanium (Ge) | 4.0-5.0 |
| Tellurium (Te) | 4.6 |
| Gallium Antimonite (GaSb) | 4.5-5.0 |
| Indium Arsenide (InAs) | 4.0 |
| Silicon (Si) | 3.7 |
| Indium Phosphate (InP) | 3.5 |
| Gallium Arsenate (GaAs) | 3.53 |
| Gallium Phosphate (GaP) | 3.31 |
| Vanadium (V) | 3 |
| Arsenic Selenide ($As_2Se_3$) | 2.8 |
| $CuAlSe_2$ | 2.75 |
| Zinc Selenide (ZnSe) | 2.5-2.6 |
| Titanium Dioxide ($TiO_2$) - solgel | 2.36 |
| Alumina Oxide (Al2O3) | 1.75 |
| Yttrium Oxide (Y2O3) | 1.75 |
| Polystyrene | 1.6 |
| Magnesium Fluoride (MgF2) | 1.37 |
| Lead Fluoride (PbF2) | 1.6 |
| Potassium Fluoride (KF) | 1.5 |
| Polyethylene (PE) | 1.5 |
| Barium Fluoride (BaF2) | 1.5 |
| Silica (SiO2) | 1.5 |
| PMMA | 1.5 |
| Aluminum Arsenate (AlAs) | 1.56 |
| Solgel Silica (SiO2) | 1.47 |
| N,N' bis(1naphthyl)-4,4'Diamine (NPB) | 1.7 |
| Polyamide-imide (PEI) | 1.6 |
| Chromium (Cr) | 3.0 |
| Tin Sulfide (SnS) | 2.6 |
| Low Porous Si | 2.56 |
| Chalcogenide glass | 2.6 |
| Cerium Oxide ($CeO_2$) | 2.53 |
| Tungsten (W) | 2.5 |
| Gallium Nitride (GaN) | 2.5 |
| Manganese (Mn) | 2.5 |
| Niobium Oxide ($Nb_2O_3$) | 2.4 |
| Zinc Telluride (ZnTe) | 3.0 |
| Chalcogenide glass + Ag | 3.0 |
| Zinc Sulfate (ZnSe) | 2.5-3.0 |
| Titanium Dioxide ($TiO_2$) - vacuum deposited | 2.43 |
| Hafnium Oxide ($HfO_2$) | 2.0 |
| Sodium Aluminum Fluoride (Na3AlF6) | 1.6 |
| Polyether Sulfone (PES) | 1.55 |
| High Porous Si | 1.5 |
| Indium Tin Oxide nanorods (ITO) | 1.46 |
| Lithium Fluoride (LiF4) | 1.45 |
| Calcium Fluoride | 1.43 |
| Strontium Fluoride (SrF2) | 1.43 |
| Lithium Fluoride (LiF) | 1.39 |
| PKFE | 1.6 |
| Sodium Fluoride (NaF) | 1.3 |
| Nano-porous Silica ($SiO_2$) | 1.23 |
| Sputtered Silica ($SiO_2$) | 1.47 |
| Vacuum Deposited Silica ($SiO_2$) | 1.46 |

In order to better illustrate one or more embodiments of the invention, and yet in no way limit the scope thereof, examples of non-quarter wave multilayer structures and their properties are provided below.

EXAMPLES

Assembly of Non-Quarter Wave Multilayer Structures

A LbL assembly process was used to produce a number of desirable non-quarter wave multilayer structures. Nanoparticle solutions of silica ($SiO_2$) and titania ($TiO_2$) are used in the LbL assembly process. Negatively charged colloidal $SiO_2$ nanoparticles SM-30 (30 wt % $SiO_2$ suspension in water, average particle size of 7 nm) were obtained from Aldrich and diluted to 0.03 wt % solution using a pH 9 buffer solution.

Positively charged $TiO_2$ nanoparticles are prepared by controlled hydrolysis of titanium tetraisopropoxide ($Ti(OCH(CH_3)_2)_4$), for example as taught by W. Choi, A. Termin, M. R. Hoffmann, *Journal of Physical Chemistry* 1994, 98, 13669. Briefly summarizing the technique, 1 L of deionized water (>18MΩ·cm, Millipore Milli-Q) is cooled down to 4° C. and its pH adjusted to 1.5 using nitric acid. Then 4 ml of $Ti(OCH(CH_3)_2)_4$ is dissolved in 100 ml of absolute ethanol and added drop wise to the chilled water. The colloidal solution (1.34 g/L) is stirred overnight and stored at 4° C., the result being positively charged $TiO_2$ nanoparticles having a 7 nm mean particle size. The mean particle size can be determined using Dynamic Light Scattering (DLS). Prior to use, the solution is filtered first with a 0.2 μm syringe filter, then a 0.02 μm syringe filter, and then diluted to 0.03 wt % with deionized water. The solution pH is then adjusted to 2.0 by the addition of 1.0 M hydrochloric acid.

Polymer solutions of Poly(allylamine hydrochloride) (PAH, $M_w$=70,000) and poly(vinylsulfonic acid sodium salt) (PVS, technical grade, 25% solution in water, $M_w$=170,000) are purchased from Sigma-Aldrich. The polymer solutions are diluted to 0.01 M concentration by repeat unit and the PAH solution is adjusted to a pH 7.5 and the PVS solution is filtered with a 0.2 μm syringe filter after its pH is adjusted to 2.0.

Layer-by-layer dipping can be facilitated using a NanoStrata spin dipper and bilayer films of $SiO_2$/polymer or $TiO_2$/polymer can be assembled on pre-cleaned VWR Microscope slides. The slides are pre-cleaned by washing in soapy water followed by placement in a 1M NaOH solution during ultrasonic vibration for 15 minutes.

Bilayers of $TiO_2$ and PVS, hereafter referred to as [$TiO_2$(2.0)/PVS(2.0)]$_n$ with the nomenclature representing an cation(solution pH)/anion(solution pH) pair, are produced by the following procedure where a single cycle that produces a single bilayer includes: (1) dipping the glass substrate into the TiO$_2$ solution for 1 minute; (2) rinsing 3 times in pH 2.0 water for 1 minute per rinse; (3) dipping into the PVS solution for 1 minute; and (4) rinsing 3 times in pH 2.0 water for 1 minute per rinse. The procedure is then repeated until the required number of bilayers (n) is produced. For the purposes of the present invention the term bilayer is defined as a cation/anion pair, e.g. TiO$_2$/PVS, which is assembled by a single cycle as described above. In addition, the term "stack" refers to a certain number of bilayers (n) that are assembled.

Bilayers of PAH and SiO$_2$, hereafter [PAH(7.5)/SiO$_2$(9.0)]$_n$, are produced by a similar procedure: (1) dipping (the glass substrate) in the PAH solution for 10 minutes; (2) rinsing 3 times in de-ionised water—first rinse for 2 minutes, second rinse for 1 minute and third rinse for 1 minute; (3) dipping in the SiO$_2$ solution for 10 minutes; and (4) rinsing 3 times in de-ionized water—first rinse for 2 minutes, second rinse for 1 minute and third rinse for 1 minute. Also similar to the procedure for the [TiO$_2$(2.0)/PVS(2.0)]$_n$ bilayers, the process is repeated until the required number of bilayers (n) is produced.

After each multilayer stack having 'n' bilayers is produced, the stack is calcinated at 550° C. for 2 hours in air in order to remove the polymer. Thereafter, the stack is allowed to cool and cleaned with an air purge. In some instances, the calcinated stack is used as a substrate for a subsequent stack to be produced thereon.

Experimental Measurement Equipment and Procedures

Regarding experimental measurements in samples produced using the above procedure(s), refractive indices and the thickness of a stack are calculated using a Woolham Co. spectroscopic ellipsometer. Data are obtained in the range of 300 to 900 nm with an incident angle of 70° and analyzed using WVASE32 software. Topographical images and roughness values are obtained using a Veeco Atomic Force Microscope with either a Nanoscope III or IV controller, and the images are analyzed using Nanoscope v710 software. Reflectance measurements are performed in the ultra-violet and visible range (200-800 nm) using a Varian Cary 5E at a relative humidity of 20%. Cross-sectional Transmission Electron Microscopy (TEM) is performed with a JOEL 2010F Analytical Electron Microscopy. For preparation of TEM samples, two relatively small pieces are cut from a desired stack or multilayer structure and pasted together using M-bond. The pasted pieces are then heated for 30 minutes at 100° C. Thereafter, the samples are prepared using mechanical grinding and ion milling at low temperatures for 1.5 hours.

Measurements

Prior to the assembly of alternating stacks to produce a given non-quarter wave multilayer structure, nanoparticle multilayers can be examined in terms of refractive index values, growth trends and surface topography. For this purpose, TiO$_2$ or SiO$_2$ nanoparticle multilayers using poly(vinyl sulfone) (PVS) and poly(allylamine hydrochloride) (PAH) as assistant polyelectrolytes, respectively, are produced.

Figure 2A:
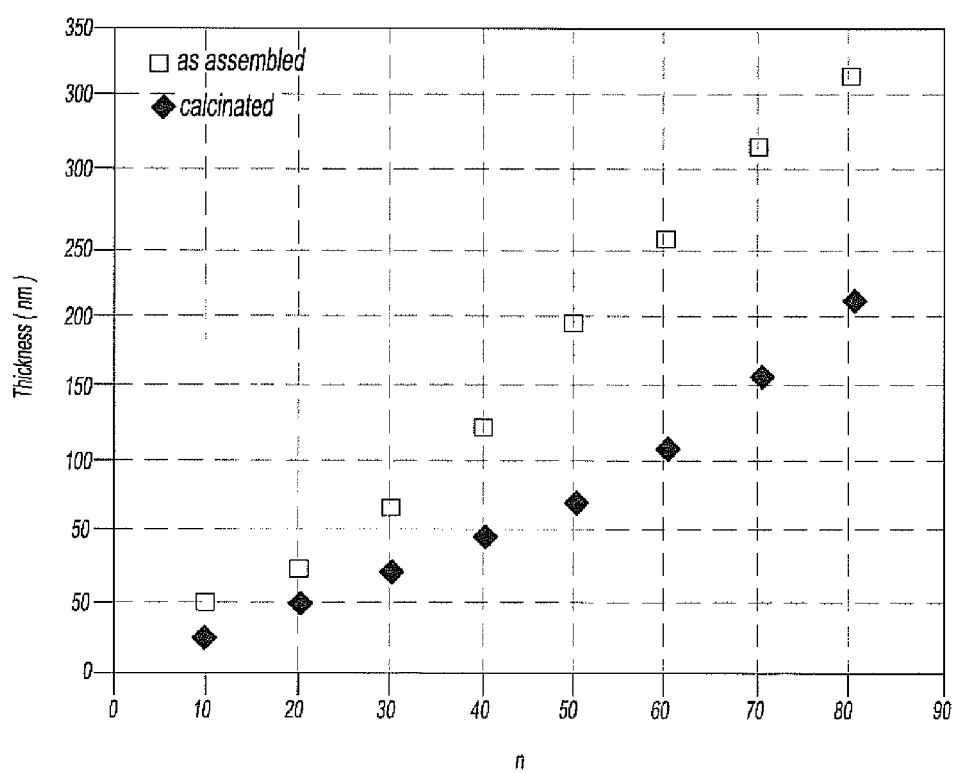
FIG. 2A is a growth curve, before and after calcination, of silica ($SiO_2$)/polymer films deposited onto glass using a layer-by-layer assembly process.

The role of particle size and choice of polyelectrolyte on nanoparticle packing can be investigated with films using poly(sodium4-styrenesulfonate) (SPS) and the same batch of TiO$_2$ nanoparticles at pH 2.0. After calcination of the [TiO$_2$(2.0)/SPS(2.0)]$_n$ films, the porosity is found to be 42% and the refractive index is 1.83. In the case of the [TiO$_2$(2.0)/PVS(2.0)]$_n$ system, PVS occupies a significant volume fraction of the assembled films, however, after removal of the polymer via calcination, TiO$_2$ nanoparticles collapse and pack more densely. As such, TiO$_2$ bilayer thickness in the [TiO$_2$(2.0)/PVS(2.0)]$_n$ bilayer system decreases from 2.2 nm as assembled to 1.1 nm after calcination as illustrated in FIG. 2A. In addition, the calcinated films have a final void volume of 24% and X-Ray diffraction analysis on as assembled and calcinated TiO$_2$ films suggests the development of more pronounced anatase nanocrystals after calcination (data not shown).

Figure 2B:
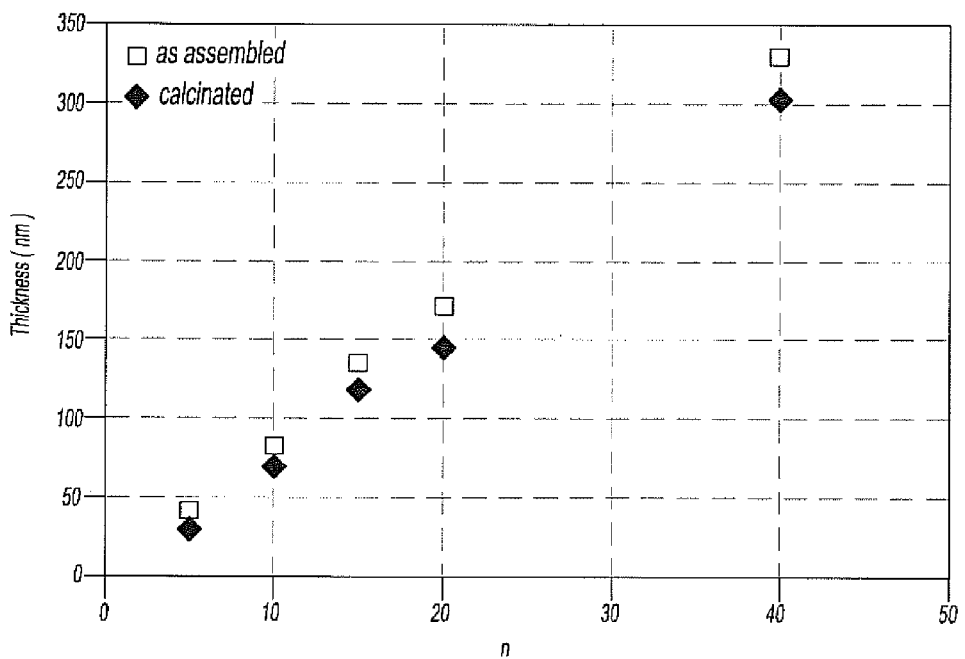
FIG. 2B is a growth curve, before and after calcination, for titania ($TiO_2$)/polymer films deposited onto a glass substrate using a layer-by-layer assembly process.

Regarding SiO$_2$ multilayers assembled on glass substrates, the SiO$_2$ nanoparticles packed more loosely than the TiO$_2$ multilayers fabricated with nanoparticles of similar size. By ellipsometry measurements, refractive index values are found to be 1.28 and 1.25 before and after calcination, respectively. In the SiO$_2$ multilayer system, the polymer occupies less overall volume (10%) and the thickness of the multilayer and volume occupied by the nanoparticles do not change significantly upon removal of polymer. Hence, the packing of nanoparticles established during the multilayer assembly process remains essentially the same after removal of the polymer and the refractive index remains relatively constant at approximately 1.25. The bilayer dependent thickness profile is shown FIG. 2B with the bilayer thickness decreasing from 8.2 to 7.5 nm after calcination, while the nanoparticle volume changes from 50 to 54% as measured using porosity measurements.

In addition to characterizing the growth and refractive index behavior of the constituent bilayers, the diffusion between SiO$_2$ and TiO$_2$ multilayer stacks with one multilayer system assembled on the other can be investigated. As such, 2-stack films having either SiO$_2$ or TiO$_2$ bilayers as the first stack are assembled and spectroscopic ellipsometric data reveals that the refractive index values of the individual stacks do not change as a result of heat treatment at 550° C. for 2 hours and the values are similar to individual stack values.

Figure 3:
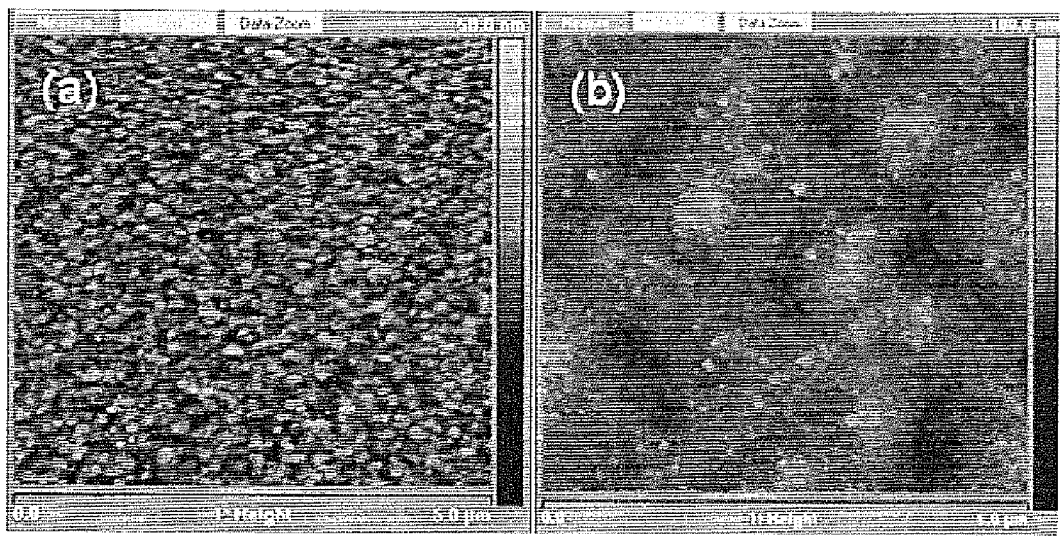
FIG. 3 illustrates two atomic force microscopy images of $TiO_2$ films on different thickness $SiO_2$ films.

The surface roughness of multilayer stacks assembled on different substrates and on other stacks can also be investigated using Atomic Force Microscopy (AFM). In particular, calcinated SiO$_2$ multilayer stacks up to 330 nm in thickness exhibit relatively smooth surfaces giving root mean square (RMS) roughness values between 5-10 nm. Regarding TiO$_2$ multilayer stacks, AFM analysis shows that TiO$_2$ multilayer stacks assembled on very thin (27 nm) and very thick (550 nm) SiO$_2$ multilayer stacks exhibit smooth surfaces independent of the thickness of the TiO$_2$ multilayer stack. For example, a 15 nm TiO$_2$ multilayer stack deposited on a 27 nm thick SiO$_2$ multilayer stack exhibits an average RMS roughness value of 5 nm as shown in the image labeled '(a)' in FIG. 3, as compared to the supporting base glass substrate roughness value of 4.2 nm. In addition, when 15 nm thick TiO$_2$ multilayer stacks are assembled on 550 nm thick SiO$_2$ multilayer stacks, the RMS roughness only increases to 11 nm as shown in the image labeled '(b)' in FIG. 3.

Using simulations of optical behavior, roughness values up to about 10 nm are shown not to significantly alter the reflectance spectrum of non-quarter wave designs. Therefore, the high and low index material stacks are considered to be optically smooth. However, it is noted that very thin TiO$_2$ multilayers assembled on much thicker SiO$_2$ multilayers (thickness>550 nm) exhibit RMS surface roughness values above 20 nm.

The non-quarter-wave structural color is designed to create a narrowband structural color with an additional UV reflectance in the 300-400 nm range. The design process includes photonic calculator simulations based on the transverse matrix method for three different colors. Based on the simulations, respective refractive indices and surface topography, assemblies having up to 11 total layers of silica and titania thin films are produced for blue-green and red colors. Evaluation of these assemblies is discussed below.

Using the refractive indices measured for a LbL structure made from alternating layers of high index of refraction material (e.g. TiO$_2$ stack=2.1) and low index of refraction material (e.g. $SiO_2$ stack=1.25), three UV-reflective structural colors were made. In particular, structural colors of blue ($\lambda_0$=450 nm), green ($\lambda_0$=580 nm), and red ($\lambda_0$=690 nm) can be manufactured. In order to afford a multiband effect, i.e. a structure that reflects a band in the visible range and a band in the NUV range, values of q=0.37 and p=3.46 are chosen for the color blue, q=0.29 and p=1.79 for the color green and q=0.243 and p=1.73 for the color red.

Figure 4:
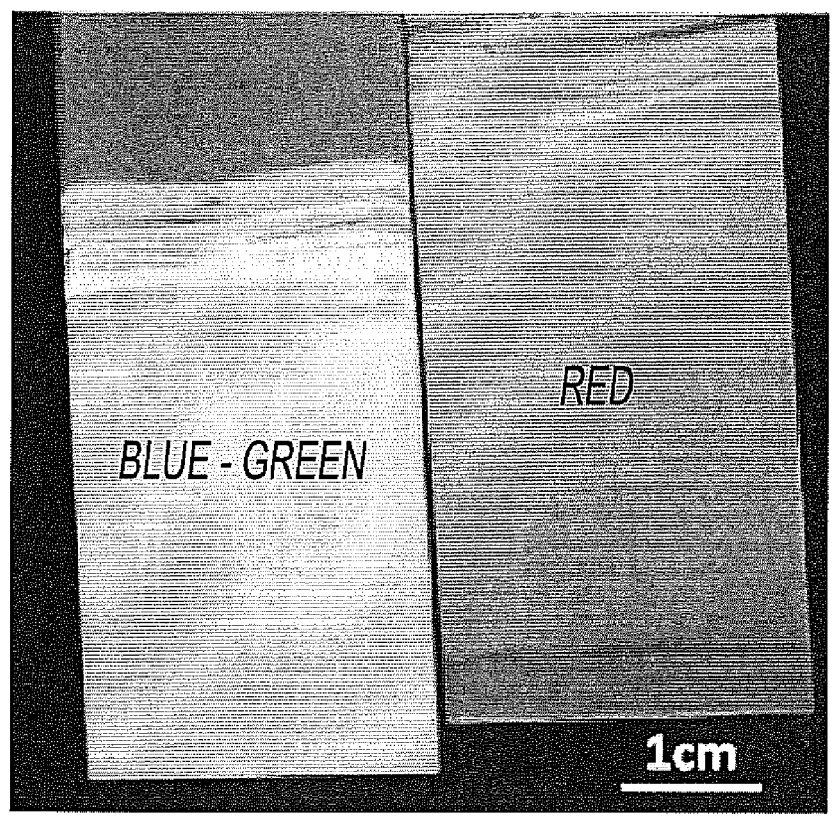
FIG. 4 is a photograph of two samples illustrating near ultraviolet (NUV) reflective structural colors.

Multistack arrays with 11 stacks of alternating $TiO_2$ and $SiO_2$ blue-green (q=0.32 and p=3.60) and red (q=0.24 and p=1.73) structural color coatings can be assembled. Photographic images of two samples that appear as blue-green and red in color images are shown in FIG. 4, respectively. The red sample exhibits an orange-like color and is due to expected broadening of the visible reflectance peak into the yellow region. The optical properties of these two coatings can be examined using UV-Visible spectrometry and compared to simulations obtained from the transverse matrix method.

Figure 5A:
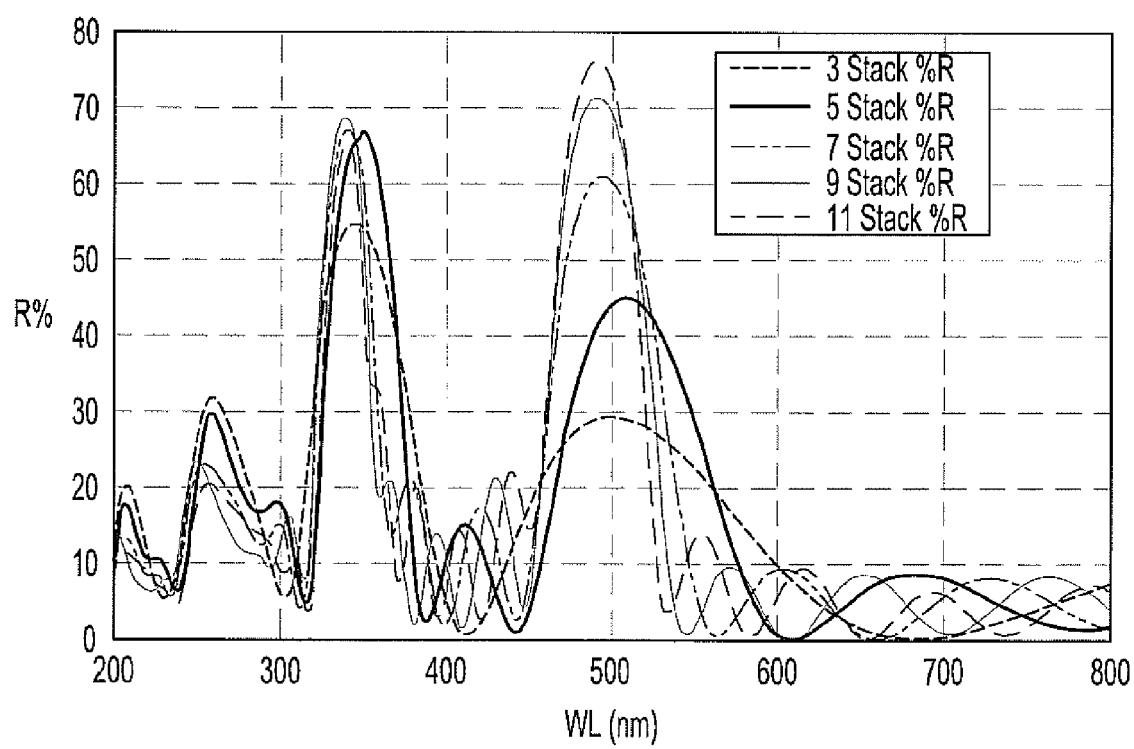
FIG. 5A is a graph illustrating measured reflectance spectra of NUV-reflective blue-green multilayer structures having 3, 5, 7, 9 and 11 stacks of alternating $TiO_2$ and $SiO_2$ layers.

FIG. 5A shows measured reflectance spectra of blue-green $TiO_2/SiO_2$ multilayer stacks (q=0.32 and p=3.60) having 3 to 11 stacks. These coatings reflect color in the blue-green region of the spectrum which results in a turquoise color. The $TiO_2$ multilayer stacks are achieved by depositing 18 bilayers of [$TiO_2$(2.0)/PVS(2.0)] which corresponds to an 18-20 nm stack thickness, whereas the $SiO_2$ multilayers are 360 nm thick with 48 [PAH(7.5)/$SiO_2$(9.0)] bilayers. The reflectance spectra of these samples clearly exhibit two distinct reflectivity bands in the NUV and visible regions of the spectrum. The NUV peak is located between 300-400 nm, while the visible peak is centered at about 500 nm as expected by the design shown in FIGS. 2A and 2B.

Increasing the number of stacks from 3 to 11 changes the reflectance behavior significantly in terms of maximum reflectance and peak bandwidth at 500 nm. In addition, a slight blue-shift of this peak can be observed with the addition of each pair of stacks. With 11 stacks, the bandwidth reduces to 50 nm and the reflectivity reaches 75%, resulting in a brilliant structural color effect as can be seen in color photographs of the samples shown in FIG. 4. Due to additional $TiO_2$ stacks and their UV absorption, reflectance does not increase with an increase in the number of stacks. Therefore, the NUV reflectance centered at 340 nm remains essentially the same after 5 stacks.

Figure 6:
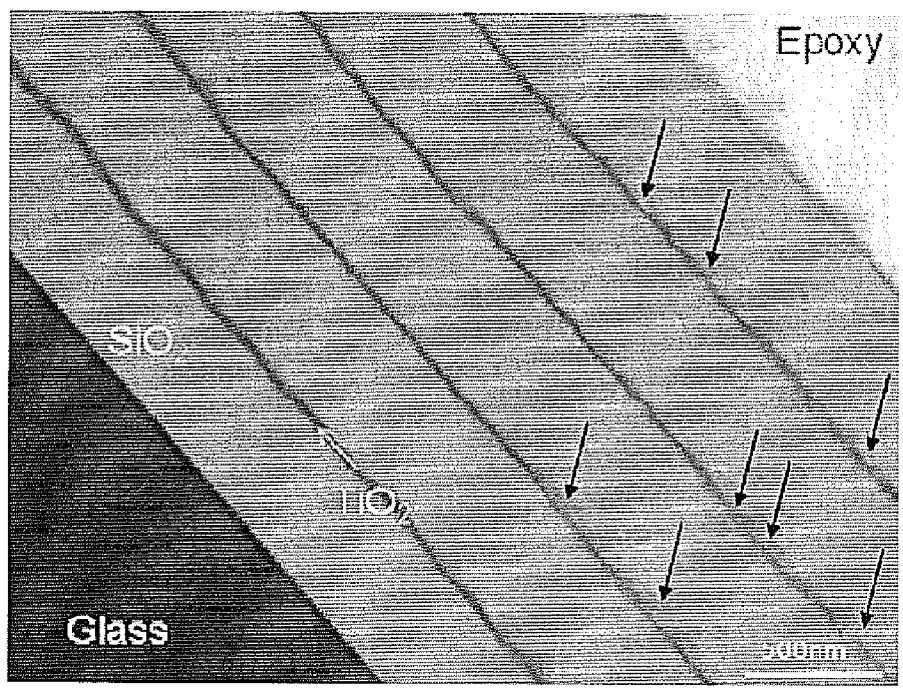
FIG. 6 is a transmission electron microscopy (TEM) image of a multilayer structure having 11 stacks of alternating $TiO_2$ and $SiO_2$ layers.

To examine the uniformity and thicknesses of the assembled stacks, cross sectional TEM images can be obtained from the multilayer structures and samples are sectioned at liquid $N_2$ temperatures through an ion milling process to minimize deformation artifacts. FIG. 6 illustrates a cross-section TEM image for an 11-stack blue-green color coating with light gray $SiO_2$ and dark gray $TiO_2$ multilayer stacks shown. It is appreciated that a cross-section slice for TEM imaging can be approximately 100 nm thick adjacent to the glass substrate while only 30 nm thick adjacent to the epoxy. As such, thin dark strips adjacent to some of the $TiO_2$ stacks can be seen, and are highlighted by arrows, in the TEM image and are assumed to be 2D projections of the 3D layer interface between $TiO_2$ and $SiO_2$ stacks within the sample width. This assumption is confirmed by the fact that varying the viewing angle of the sample thickness results in changes of the thickness of the dark strips.

To estimate stack thicknesses, five measurements of both the $TiO_2$ and $SiO_2$ multilayer stacks can be recorded. The $SiO_2$ multilayer stacks are found to be 348±30 nm in thickness whereas the $TiO_2$ multilayer stacks are 26±8 nm in thickness, with exception in some areas where roughness values are over 50% of the film thickness as described above.

It is appreciated that the stack structure revealed by the TEM image is consistent with UV-Visible and simulation data, further validating the excellent control over the assembly of nanoparticles afforded by the LbL process. The interfacial width between the high and low refractive index stacks is estimated to be below 20 nm, which is much lower than the reflected wavelengths of light thereby confirming the absence of any significant loss of photon energy due to interfacial scattering.

Figure 5C:
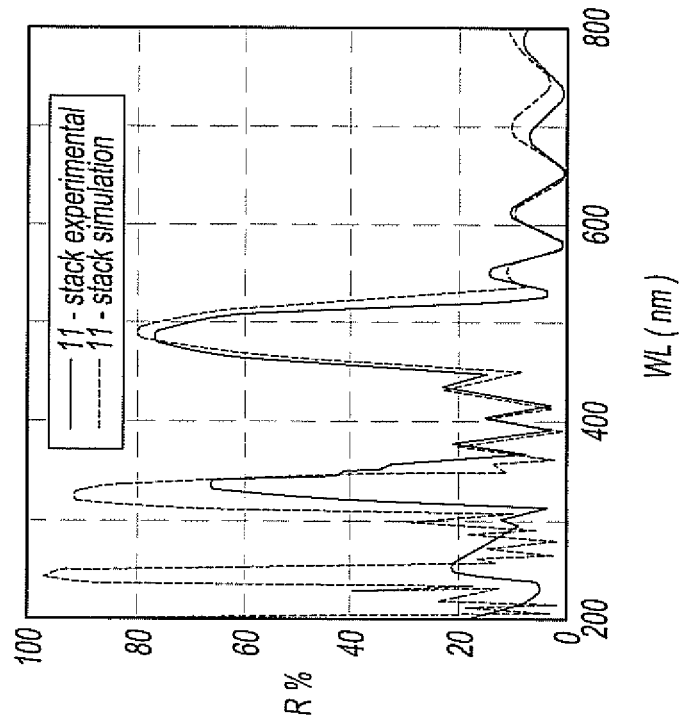
FIG. 5C is a graph comparing an experimentally measured reflectance spectrum to a simulated reflectance spectrum for a NUV-reflective blue-green multilayer structure having 11 stacks of alternating $TiO_2$ and $SiO_2$ layers.
Figure 5B:
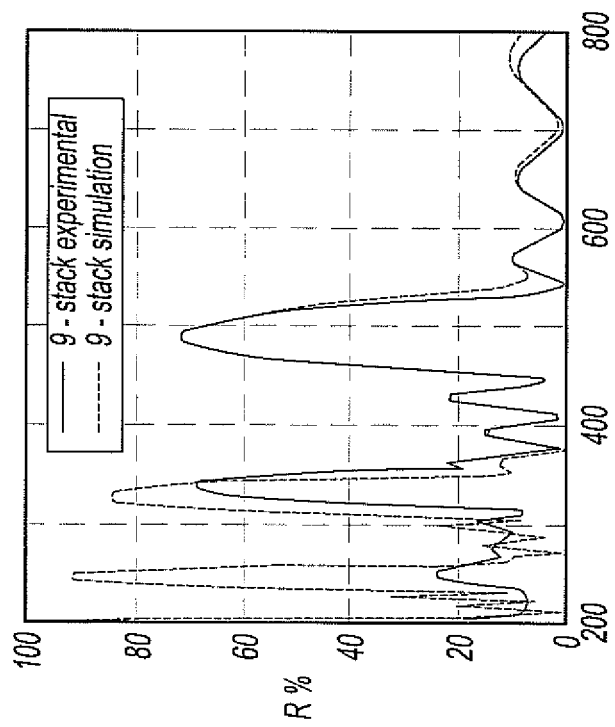
FIG. 5B is a graph comparing an experimentally measured reflectance spectrum to a simulated reflectance spectrum for a NUV-reflective blue-green multilayer structure having 9 stacks of alternating $TiO_2$ and $SiO_2$ layers.

In order to demonstrate control over thickness and refractive index values for multiple stack films, simulations for the reflectance of each blue-green color sample are compared with experimental data. For the simulations, refractive index values from ellipsometry measurements are used, i.e. a refractive index of 1.25 for $SiO_2$ multilayer stacks and 2.05 for $TiO_2$ multilayer stacks at 630 nm. FIGS. 5B and 5C illustrate a comparison between simulation results and experimental data for 9- and 11-stack samples, respectively. As shown in FIG. 5B, the visible region reflectance is achieved exactly as expected, however, a reflectance reduction in the UV region between 300 and 400 nm is observed. This decrease in the UV region is expected due to the UV absorption of the $TiO_2$ multilayer stacks and is further confirmed by the observed reduction in the intensity of the NUV peak with increasing number of stacks. In addition, the second UV peak between 200-300 nm is absent due to the UV absorption of the glass substrate below 300 nm.

In the 11-stack sample, there is a slight decrease in the visible reflectance. In order to understand the effect of surface topography on the loss of reflectance, the 11-stack coating can be analyzed using AFM. The result of an RMS roughness analysis demonstrates that the 11-stack surface has a roughness value of 27 nm and can be responsible for reflectance loss. When 9 and 7 stack samples are analyzed for roughness, they present relatively smoother surfaces with RMS roughness values of 16 nm and 14 nm, respectively.

Figure 7A:
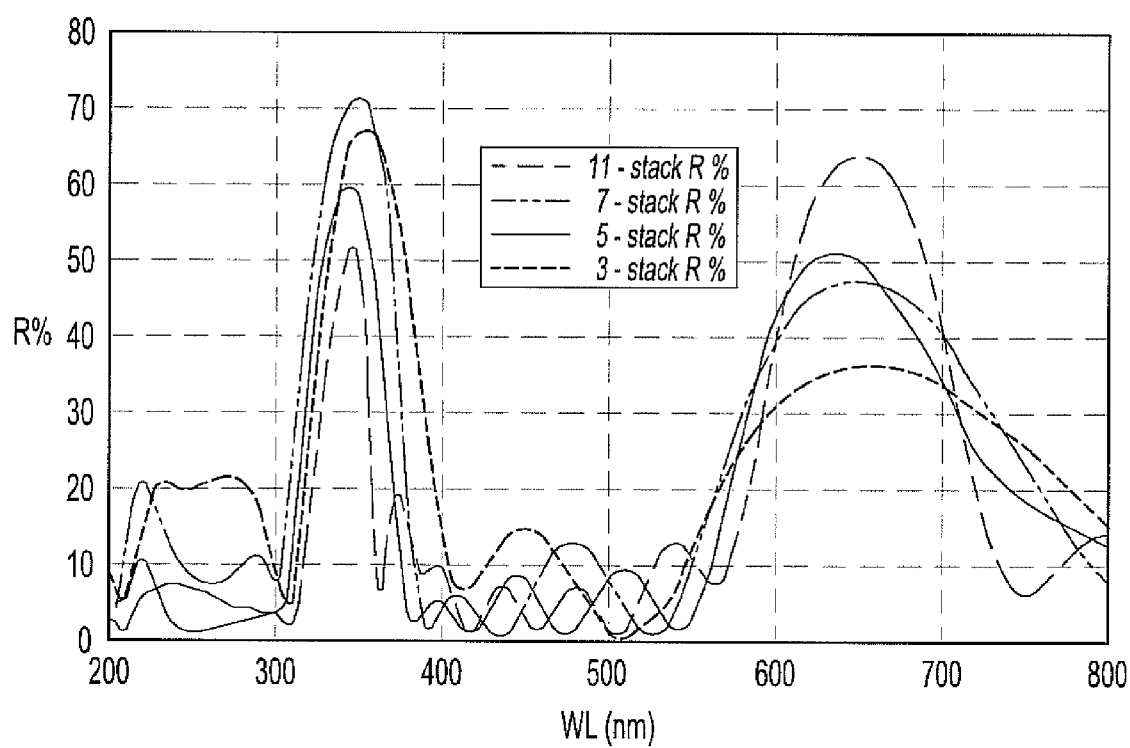
FIG. 7A is a graph illustrating measured reflectance spectra of NUV-reflective red multilayer structures having 3, 5, 7, and 11 stacks of alternating $TiO_2$ and $SiO_2$ layers.

In addition to the blue-green sample, multilayers can be assembled with a visible reflectance peak centered at 690 nm. A photographic image of such a multilayer structure is shown in FIG. 4 as the red sample. Most of the characteristics observed with the green-blue sample are also observed in the red sample with FIG. 7A illustrating measured reflectance spectra for samples having 3, 5, 7 and 11 stacks. As shown in the figure, the addition of more stacks results in an increase of the intensity of the visible reflectivity band as well as a minor blue-shift. In the 11 stack sample, the reflectance peak displayed a bandwidth of approximately 100 nm with a 65% reflectance, the bandwidth explaining the orange-like color that can be seen in a color photographic image of the sample. The secondary Bragg peak in the NUV region is essentially the same as the peak observed in the green-blue sample.

Figure 7C:
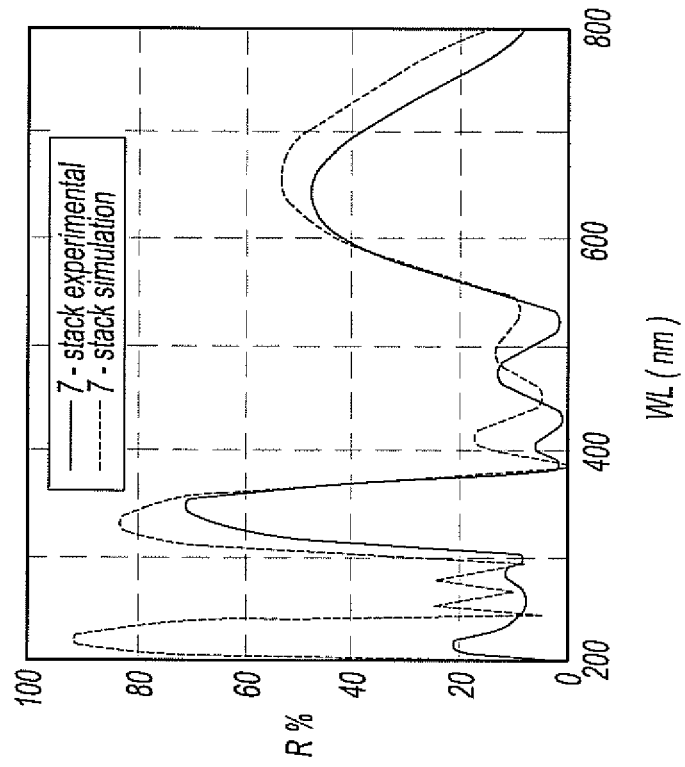
FIG. 7C is a graph comparing an experimentally measured reflectance spectrum to a simulated reflectance spectrum for a NUV-reflective red multilayer structure having 7 stacks of alternating $TiO_2$ and $SiO_2$ layers.
Figure 7B:
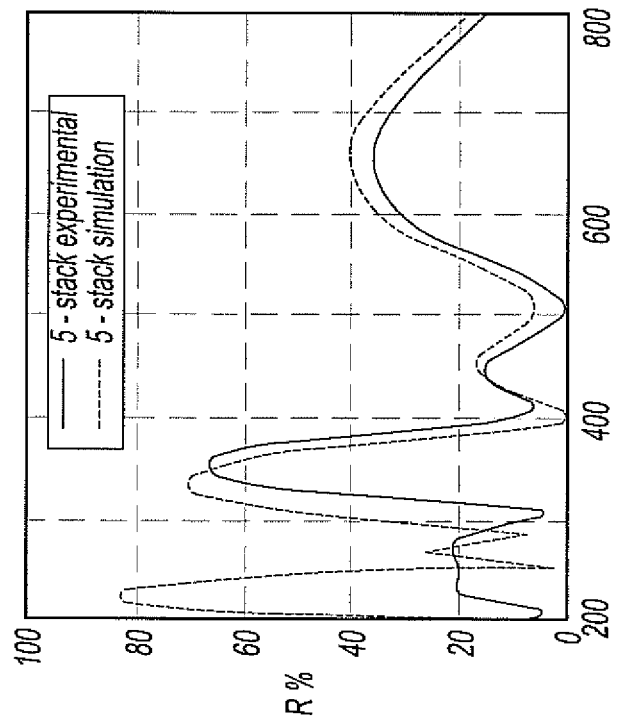
FIG. 7B is a graph comparing an experimentally measured reflectance spectrum to a simulated reflectance spectrum for a NUV-reflective red multilayer structure having 5 stacks of alternating $TiO_2$ and $SiO_2$ layers.

The reflectance behavior of the 5 and 7 stack samples is compared to simulations in FIGS. 7B and 7C, respectively. In the 5 stack sample, the experimental data matches well with simulation for both visible and NUV region peaks. Again, a slight decrease of reflectance is observed with increasing stacks resulting from either surface roughness induced diffuse scattering and/or absorption of UV light by the $TiO_2$ multilayers.

Figure 8A:
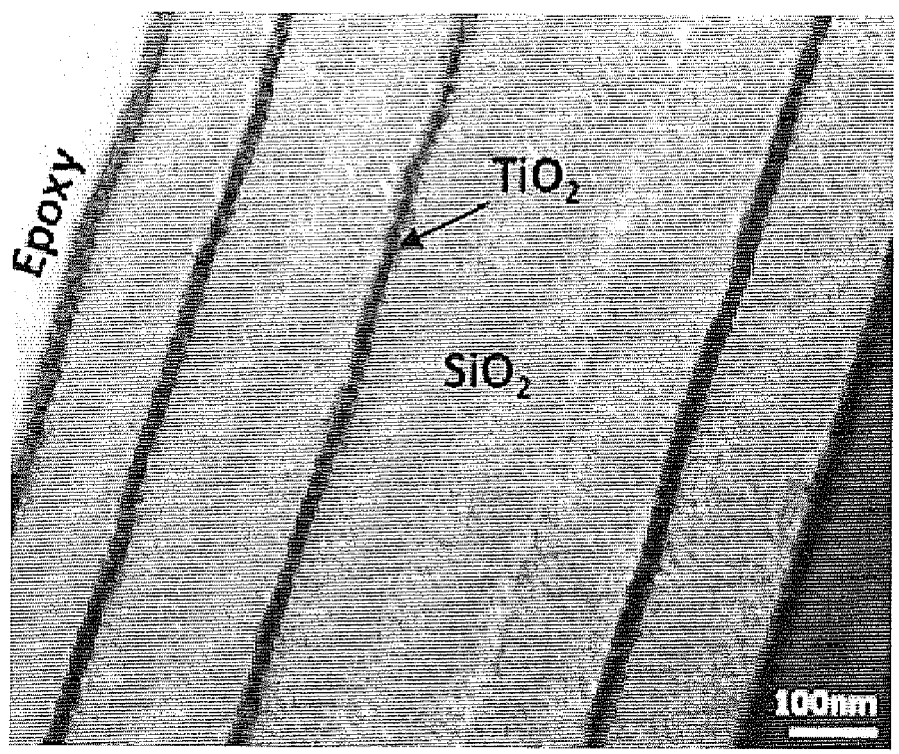
FIG. 8A is a TEM of a multilayer structure with an optical defect having 9 stacks of alternating $TiO_2$ and $SiO_2$ layers.
Figure 8B:
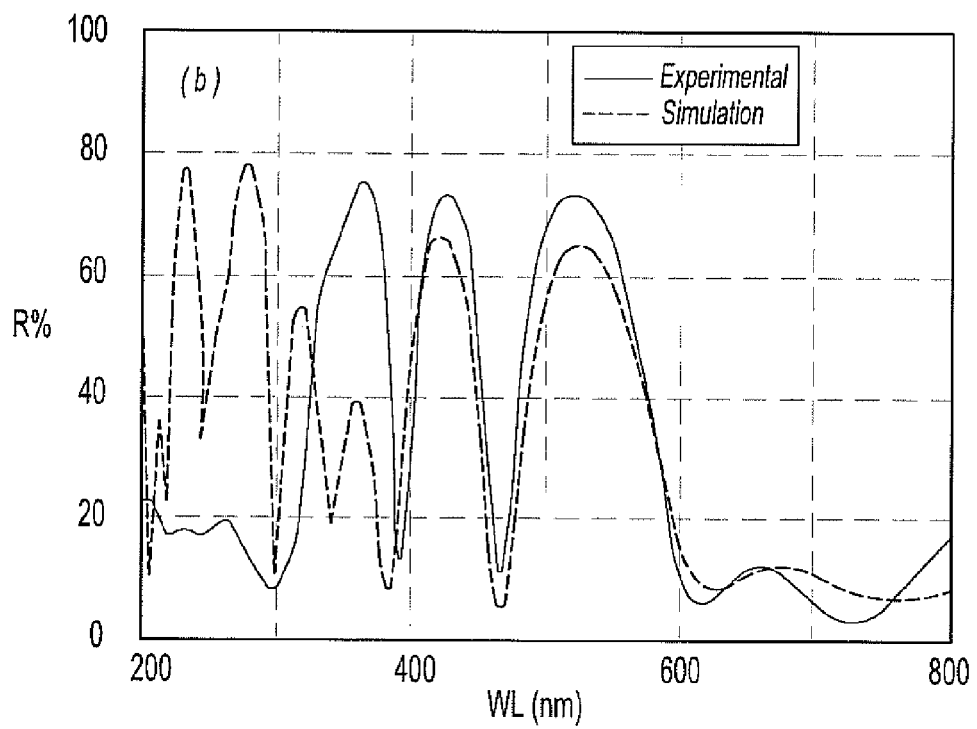
FIG. 8B is a graph comparing an experimentally measured reflectance spectrum to a simulated reflectance spectrum for a NUV-reflective multilayer structure with an optical defect having 9 stacks of alternating $TiO_2$ and $SiO_2$ layers.

Referring now to FIGS. 8A and 8B, the periodicity of a stack structure is disrupted by introducing a thicker $SiO_2$ multilayer stack as a optical defect in the center of a 9-stack structure. The 9-stack structure starts and ends with a 27 nm $TiO_2$ stack and the $4^{th}$ stack includes the defect layer with a generally 400 nm thick $SiO_2$ stack. Typical thickness values of each stack along a given line (not shown) are as follows: starting from glass substrate, $d_H$=27 nm, $d_L$=154 nm, $d_H$=27 nm, $d_L$=400 nm, $d_H$=18 nm, $d_L$=190 nm, $d_H$=18 nm, $d_L$=109 nm, and $d_H$=27 nm. As shown by these values and the TEM image in FIG. 8A, minor aperiodicity exists in the remaining stacks that do not include the optical defect.

The UV-visible reflectivity spectrum of the structure shown in FIG. 8A is shown in FIG. 8B. The spectrum is rather complex, however the reflectance dip observed near 475 nm is a direct consequence of the added $SiO_2$ defect layer. In addition, the calculated reflectance spectrum using thickness values extracted from the TEM data matches well in the visible range, but not very well in the NUV range. The poor match between experiment and simulation in the UV range (<300 nm) can be due to UV absorption originated from the supporting glass substrate.

It is appreciated that additional values of q and p can be selected in order to provide other UV-reflective structural colors. In addition, the selection of q and p affords for a flexible process for designing such colors. One process of selecting a particular q and/or p follows.

Figure 9:
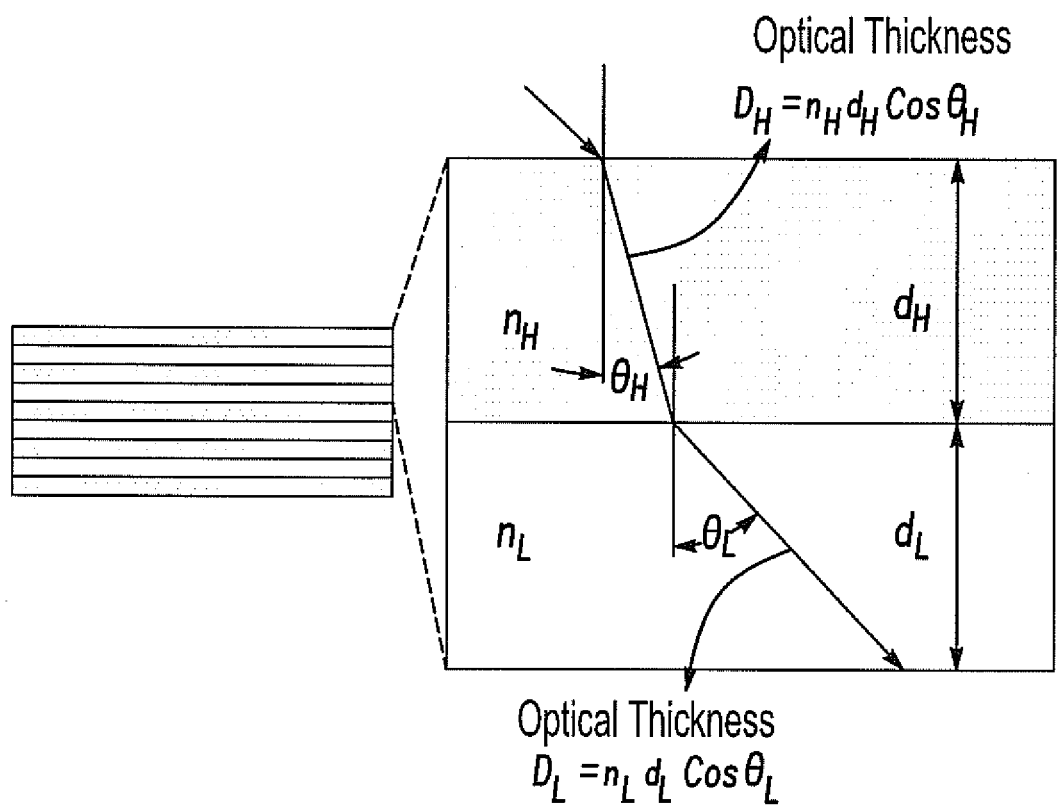
FIG. 9 is a schematic illustration of a multilayer stack showing an optical thickness for a high index of refraction layer and an optical thickness for a low index of refraction layer.

Referring to FIG. 9, a general relation between multiple reflection peaks, q and p can be expressed as:

$$2n_L d_L p \cos(\theta_L) + 2n_H d_H q \cos(\theta_H) = M\lambda, M=1, 2, 3, \ldots \quad (1)$$

where q and p are as defined above, M is an integer and thus $M\lambda$ can be the multiple reflection peaks. It is appreciated that if q=p=1, then $\lambda=\lambda_o$. For normal electromagnetic wave incidence, Equation 1 can be reduced to:

$$2n_L d_L p + 2n_H d_H q = M\lambda \quad (2)$$

In addition:

$$d_L = L = \frac{\lambda_o}{4n_L} \quad (3)$$

$$d_H = H = \frac{\lambda_o}{4n_H}$$

Thus for the above examples, and for illustrative purposes only, q=0.37 and p=3.46 were selected for the color blue ($\lambda_o$=450 nm); q=0.29 and p=1.79 for the color green ($\lambda_o$=580 nm); and q=0.243 and p=1.73 for the color red ($\lambda_o$=690 nm). In addition, once q and p have been selected, the location of the multiple reflected peaks can be predicted from Equation 2 by solving for $\lambda$. In particular, for blue, $\lambda$=1.914$\lambda_o$(1/M) and peaks are predicted at $\lambda$=861 nm (M=1), 430 nm (M=2) and 287 nm (M=3). The same can be done for the green and red colors also.

In this manner, a flexible process for designing and/or fabricating a multilayer structure that is a UV-reflective structural color can include: (1) selecting a desired color/wavelength to be reflected ($\lambda_o$); (2) selecting a desired low index of refraction index material; (3) selecting a desired high index of refraction material; (4) selecting a q and p that satisfy Equation 2 for $\lambda=\lambda_o$; and (5) fabricating a multilayer structure from the low index of refraction index material and the high index of refraction material such that alternating layers of the two materials have thicknesses of pL and qH, respectively, as defined above. It is appreciated that these steps need not be performed in the exact order as outlined above and that additional steps can be added and one or more of the included steps can be omitted.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

REFERENCES

1. A. K. Bendiganavale, V. C. Malshe, *Recent Patents on Chemical Engineering* 2008, 69.
2. P. Berdahl, H. Akbari, R. Levinson, W. A. Miller, *Construction and Building Materials* 2008, 22, 423.
3. ASTM Standard D 4214-98.ASTM International. West Conshohocken, (Pa., USA) 1998.
4. G. Borgia, *Behav. Ecol.* 2008, 19, 740.
5. I. N. Flamarique, G. A. Mueller, C. L. Cheng, C. R. Figiel, *Proceedings of the Royal Society B-Biological Sciences* 2007, 274, 877.
6. A. Kellie, S. J. Dain, P. B. Banks, *J. Comp. Physiol., A FIELD Full Journal Title: Journal of Comparative Physiology, A: Neuroethology, Sensory, Neural, and Behavioral Physiology* 2004, 190, 429.
7. L. Siefferman, G. E. Hill, *Animal Behaviour* 2005, 69, 67.
8. J. A. Endler, *Animal Behaviour* 1987, 35, 1376.
9. C. W. Thompson, M. C. Moore, *Animal Behaviour* 1991, 42, 745.
10. D. M. Rowe, E. J. Denton, *Philosophical Transactions of the Royal Society of London Series B-Biological Sciences* 1997, 352, 531.
11. R. O. Prum, *Journal of Experimental Zoology* 1999, 285, 291.
12. R. O. Prum, R. L. Morrison, G. R. Teneyck, *Journal of Morphology* 1994, 222, 61.
13. T. Nuttall, *A manual of the ornithology of the United States and of Canada*, Hilliard and Brown, Cambridge 1832-1834.
14. D. J. Klem, *Wilson Bulletin* 1989, 101, 606.
15. C. R. Griffin, A. M. Hoopes, Natural Resources Science Department, University of Rhode Island Kingston, USA 1991, 102.
16. D. J. Klem, *Proceedings of the Pennsylvania Academy of Science* 1981, 55, 90.
17. E. J. Maier, *Naturwissenschaften* 1993, 80, 476.
18. D. P. Young, Jr., W. P. Erickson, M. D. Strickland, R. E. Good, K. J. Sernka, National Renewable Energy Lab., Golden, Colo. (US), 2003, 67.
19. J. E. Brown, J. M. Dangler, F. M. Woods, K. M. Tilt, M. D. Henshaw, W. A. Griffey, M. S. West, *Hortscience* 1993, 28, 895.
20. M. Edelstein, S. H. Paris, R. Shir, G. Beibowitz, H. Nerson, Y. Burger, *Hassadeh* 1991, 71, 868.
21. J. B. Kring, *Bulletins in Entomology Society of America* 1962, 8, 159.
22. J. B. Kring, Smith, Ray F., Thomas E. Mittler and Carroll N. Smith (Ed.). Annual Review of Entomology, Vol. 17. Vii+555 p. Illus. Annual Reviews, Inc.: Palo Alto, Calif., U.S.a.; in Cooperation with the Entomological Society of America 1972, 461.
23. A. Chitnis, J. P. Zhang, V. Adivarahan, M. Shatalov, S. Wu, R. Pachipulusu, V. Mandavilli, M. A. Khan, *Applied Physics Letters* 2003, 82, 2565.
24. E. Feltin, J. F. Carlin, J. Dorsaz, G. Christmann, R. Butte, M. Laugt, M. Ilegems, N. Grandjean, *Applied Physics Letters* 2006, 88.
25. A. J. Fischer, A. A. Allerman, M. H. Crawford, K. H. A. Bogart, S. R. Lee, R. J. Kaplar, W. W. Chow, S. R. Kurtz, K. W. Fullmer, J. J. Figiel, *Applied Physics Letters* 2004, 84, 3394.

26. H. Peng, E. Makarona, Y. He, Y. K. Song, A. V. Nurmikko, J. Su, Z. Ren, M. Gherasimova, S. R. Jeon, G. Cui, J. Han, *Applied Physics Letters* 2004, 85, 1436.

27. W. L. Barnes, A. Dereux, T. W. Ebbesen, *Nature* 2003, 424, 824.

28. J. D. Joannopoulos, P. R. Villeneuve, S. H. Fan, *Nature* 1997, 386, 143.

29. O. Painter, R. K. Lee, A. Scherer, A. Yariv, J. D. O'Brien, P. D. Dapkus, I. Kim, *Science* 1999, 284, 1819.

30. A. L. Ingram, A. R. Parker, *Philosophical Transactions of the Royal Society B-Biological Sciences* 2008, 363, 2465.

31. A. R. Parker, *Journal of Optics a-Pure and Applied Optics* 2000, 2, R15.

32. A. R. Parker, *Philosophical Transactions of the Royal Society of London Series a-Mathematical Physical and Engineering Sciences* 2004, 362, 2709.

33. A. R. Parker, N. Martini, *Optics and Laser Technology* 2006, 38, 315.

34. S. Kinoshita, S. Yoshioka, *ChemPhysChem* 2005, 6, 1442.

35. M. F. Land, *Prog Biophys Mol Biol* 1972, 24, 75.

36. S. J. Orfanidis, *Optimum Signal Processing*, McGraw Hill, New York 1988.

37. S. J. Orfanidis, in *Electromagnetic Waves and Antennas*, http://www.ece.rutgers.edu/~orfanidi/ewa/, 2004, 192.

38. Y. Fink, J. N. Winn, S. H. Fan, C. P. Chen, J. Michel, J. D. Joannopoulos, E. L. Thomas, *Science* 1998, 282, 1679.

39. P. Amezaga-Madrid, W. Antunez-Flores, I. Monarrez-Garcia, J. Gonzalez-Hernandez, R. Martinez-Sanchez, M. Miki-Yoshida, *Thin Solid Films* 2008, 516, 8282.

40. H. Randhawa, *Thin Solid Films* 1991, 196, 329.

We claim:

1. A multilayer structure comprising:
   a plurality of alternating layers of a low index of refraction material and a high index of refraction material;
   said plurality of alternating layers of said low index of refraction material and said high index of refraction material reflecting electromagnetic radiation in the ultraviolet region and a narrow band of electromagnetic radiation in the visible region;
   said plurality of alternating layers of said low index of refraction material and said high index of refraction material having a layered structure described by [A 0.5 qH pL (qH pL)$^N$ 0.5 qH G], where:
   A represents air;
   q is a multiplier of a quarter-wave thickness of said high index of refraction material;
   H is the quarter wave thickness of the high refracting index material for a given wavelength $\lambda_0$;
   p is a multiplier of a quarter-wave thickness of said low index of refraction material;
   L is the quarter-wave thickness of the low refracting index material for said given wavelength $\lambda_0$;
   N represents the total number of layers between bounding half layers of said high index of refraction material; and
   G represents a substrate.

2. The multilayer structure of claim 1, wherein said plurality of alternating layers of said low index of refraction material and said high index of refraction material each have a non-quarter wave thickness.

3. The multilayer structure of claim 1, wherein said plurality of alternating layers of said low index of refraction material and said high index of refraction material reflect more than 70% of said electromagnetic radiation in the ultraviolet region and more than 60% of said narrow band of electromagnetic radiation in the visible region.

4. The multilayer structure of claim 1, wherein said plurality of alternating layers of said low index of refraction material and said high index of refraction material are made by a layer-by-layer process.

5. The multilayer structure of claim 4, wherein said low index of refraction material is made from $SiO_2$ nanoparticles and said high index of refraction material is made from $TiO_2$ nanoparticles.

6. The multilayer structure of claim 1, wherein said plurality of alternating layers of said low index of refraction material and said high index of refraction material are in the form of a flake.

7. The multilayer structure of claim 6, wherein said flake is a pigment for a paint.

8. The multilayer structure of claim 7, wherein said paint is an ultraviolet reflective structural color.

9. A process for making a multilayer structure that is an ultraviolet-reflective structural color, the process comprising:
   providing a low index of refraction material and a high index of refraction material;
   fabricating a first layer from the low index of refraction material;
   fabricating a second layer from the high index of refraction material adjacent to and in contact with the first layer;
   the first layer and the second layer having a thickness of pL and qH, respectively, and being part of an ultraviolet-reflective structural color layered structure described by [A 0.5 qH pL (qH pL)$^N$ 0.5 qH G], where:
   A represents air;
   q is a multiplier of a quarter-wave thickness of said high index of refraction material;
   H is the quarter wave thickness of the high refracting index material for a given wavelength $\lambda_0$;
   p is a multiplier of a quarter-wave thickness of said low index of refraction material;
   L is the quarter-wave thickness of the low refracting index material for said given wavelength $\lambda_0$;
   N represents the total number of layers between bounding half layers of said high index of refraction material; and
   G represents a substrate.

10. The process of claim 9, further including fabricating a plurality of alternating first layers and second layers.

11. The process of claim 10, wherein the plurality of first layers and second layers are fabricated using layer-by-layer processing.

* * * * *